Patented June 9, 1953

2,641,550

UNITED STATES PATENT OFFICE 2,641,550

PROCESS FOR OBTAINING VOLATILE FLAVORS

Kenneth G. Dykstra, Albion, N. Y., and Domenic De Felice, Morristown, N. J.

No Drawing. Application July 17, 1951, Serial No. 237,306

19 Claims. (Cl. 99—205)

This invention relates to the capturing of the volatile flavors found in various fruit materials such as whole fruit, fruit pieces, fruit juices, fruit nectars or extracts and the like. Such fruit materials include the citrus fruit materials and juices and the fruit materials and juices or nectars obtained from apples, tomatoes, pineapples, grapes, raspberries, cherries, strawberries, apricots, plums, peaches, pears and the like. The invention has particular application to the concentration of fruit juices and extracts such as those mentioned above and still more particularly to the recovery of the volatile aromatic flavoring principles or essences responsible for the fresh-like character thereof so that the same may be combined with the concentrated fruit juices or extracts.

An object of the present invention is to provide for the capturing, with substantial completeness, of the volatile aromatic flavoring constituents in their original, natural condition with the quality and flavor thereof unchanged.

Another object of the invention is to provide for the capturing of the volatile flavoring constituents in a high degree of concentration.

Still another object is to provide for recovering the volatile flavoring constituents, which are normally lost during the evaporation accompanying concentration, particularly the most volatile or fresh-like flavors, so that the same may be employed for flavoring various foodstuffs or may be returned to the concentrated fruit material from which they were derived.

A further object is to provide a fruit juice concentrate containing the entire flavor and freshlike character of the original fruit juice.

Concentrates of fruit juices which contain high percentages of water such as those aforementioned are generally prepared by removing the water therefrom at atmospheric pressure or under vacuum by the application of heat. In other cases the concentration may be effected by removing the water as ice by freezing, the ice being removed by sublimation or separated from the remaining liquid by filtration with washing.

Where evaporation is used certain difficulties are encountered due to the application of temperatures sufficiently high to remove the water at a high enough rate to render the process commercial. It is well known that the delicate flavors of fruit materials such as those mentioned above are easily injured by the application of heat and, also, that in the course of removing the water the more volatile flavoring constituents are removed along with the water vapor and thus lost. The use of pressures less than atmospheric in connection with the evaporation of the water permits the use of lower temperatures so that the adverse effects caused by heating are correspondingly reduced. However, while the use of the very low pressures permits the use of such low evaporation temperatures that the impairment of the flavoring constituents is minimized and in many cases eliminated, the problem of recovering or capturing the volatile flavoring constituents remains. In fact, at the lower absolute pressures the problem of capturing or condensing the volatile fruit flavors is rendered more difficult. These flavoring or aromatic principles being quite volatile at atmospheric pressure are in a sense rendered relatively much more volatile at the very low absolute pressures required for the evaporation.

Various attempts have been made to recover the volatile flavoring or aromatic constituents so that they might be combined with the concentrated juices or extracts from which they were derived or so that such flavoring constituents might be used in the flavoring of other foodstuffs. Such attempts, however, have employed only ice-water or brine temperatures in the condensation of the flavoring or aromatic principles. Such condensing temperatures are not adequate to effect the capturing of all of the volatile flavoring constituents under the low pressures required to permit the use of low evaporation temperatures. Accordingly, the more volatile flavoring constituents responsible for the fresh-like character of the fruit are lost.

In order to overcome these difficulties, it has been attempted to capture the volatile constituents by absorbing the same in cold aqueous liquid, preferably a concentrated solution of the essences or volatile flavoring constituents themselves, using a scrubbing tower or similar device. It is reported that the latter method is adequate for capturing the fruit flavoring principles and providing the same in concentrated form. However, this absorption technique fails to do so because it requires the use of atmospheric or higher pressures which necessitates in turn the use of excessive temperatures for evaporation with consequent deterioration of all of the volatile fruit flavors, especially those responsible for the fresh fruit character.

It has now been found that the aromatic or volatile flavoring constituents of fruit materials which are responsible for the fresh-like character thereof can be removed from such materials including whole fruit, fruit pieces, fruit juices, fruit extracts and the like and substantially entirely recovered in a high degree of concentration at temperatures below −130° F. As aforementioned, it is possible to collect fruit flavoring materials at temperatures of 32° F. or somewhat below but the results are not satisfactory. The present invention therefore comprises the use of sufficiently low reduced pressures so that the volatile flavoring constituents can be removed from the fruit materials at temperatures sufficiently low so that the quality of the flavoring constituents is not impaired, and thereafter recovering the flavor constituents, particularly those responsible for the fresh-like character of the fruit materials, at temperatures below −130° F.

The fruit materials to which the present invention may be applied include whole fruit, fruit pieces, extracts, purees, nectars and juices such as are derived from oranges, lemons, limes, grapefruit, tangerines, kumquats, apples, pineapples, grapes, tomatoes, plums, blackberries, blueberries, raspberries, cherries, strawberries and the like.

The process of the present invention may be carried out in various ways from the standpoint of providing for the separation of the volatile fruit flavors from the fruit materials. One eminently suitable manner of providing for the aforesaid separation or removal is to use vacuum or low pressure evaporation in processing a fruit juice. Such may be carried out in the commercially available apparatus used in the production of the frozen citrus juice concentrates. A typical evaporator setup for this purpose is described in the periodical, "Food Industries" for October of 1948 on pages 71–73 thereof. The fruit juice is ordinarily concentrated by evaporating the water under an absolute pressure of about 20 mm. and at a juice temperature of about 75° F. in the case of the heat sensitive juices, e. g., the citrus juices, or at a pressure of about 30 mm. and at a juice temperature of about 85° F. in the case of the less heat sensitive juices, e. g., apple and tomato juice. Under these conditions substantially all of the volatile flavor may be removed from the juice upon the evaporation of not more than 20% and as little as 2% of the volume of the juice.

While the maximum temperature to which some of the fruit juices can be heated without any appreciable flavor deterioration is about 150° F., it is preferred to employ a temperature of below 90° F. in the case of the citrus fruit juices and fresh grape juice. Other juices are less heat sensitive, e. g., apple, tomato and pasteurized grape juice. There are, however, ranges of temperatures in the case of each juice which provide for avoiding flavor impairment while permitting efficient operation from the standpoint of production, heat transfer, economy of operation and the like. In the case of the various citrus juices, pineapple juice and fresh grape juice, the optimum temperatures of operation are within the range of 60°–85° F., while in the case of pasteurized grape juice, apple juice and tomato juice, the optimum temperatures are within the range of about 75°–105° F.

The condensation of the water vapor and the volatile aromatic constituents which are brought over by evaporating the fruit juice or other fruit extract under reduced pressure may be carried out in various ways. It is possible to condense the entire material at a temperature below −130° F. but to do so is wasteful of such an expensive refrigerant as liquid air, liquid nitrogen, liquid oxygen, liquid helium or others which are employed in providing temperatures below −130° F. Ordinarily it will be found desirable to carry out the condensation in three stages, the first stage condenser being maintained at a temperature of 32°–85° F. or that available on cooling with tap water, the second stage condenser being cooled with a brine at a temperature between 32° F. and −95° F., while the third stage condenser is maintained at the temperatures below −130° F. with which condensing temperatures the process of the present invention is more particularly concerned.

Under these conditions the bulk of the distillate, i. e., about 90–98% is removed in the first stage condenser. This material, which is entirely water and contains no detectable fruit flavor material is discarded.

In the second stage condenser is recovered the less volatile or base flavoring constituents. In general, these constituents are the materials of higher molecular weight and in the case of the citrus fruit juices are the citrus oils. In contrast to the citrus juices, the base flavor fractions derived from fresh grape juice, apple juice and many of the other fruit juices are water soluble. While the base flavors obtained in the second stage condenser are usually readily identified with their source material, such is not always the case. For example, with apple juice the base flavor provided at the second stage condenser has a cider-like character which would not be suspected as being present in fresh juice. The process of the invention, therefore, provides an advantage in that such fractions can be blended back to whatever extent desired or even discarded. Such is likewise the case with the base flavors obtained from the citrus juices. The level of citrus oil which is preferred in the different citrus juices varies with the variety, character and source of the fruit. Moreover, the commercially extracted juices usually contain more citrus oil than is desirable. It is now possible to control the level of the citrus oil contained in the juice concentrate. Also there are many flavoring uses for the citrus oils, and the oils provided by the process of the present invention are of an excellent quality, far surpassing those commercially available today.

The most volatile flavor constituents, namely, those responsible for the fresh-like character of the fruit juice are condensed and recovered in the third stage condenser at temperatures below −130° F. In all cases, the fruit essences or flavors provided in this condenser are obtained in a relatively high degree of concentration. The more volatile flavor constituents obtained in this condenser from the various citrus juices are not readily identifiable with the source materials from which they are derived. Such is not the case, however, with the fresh-like flavor fraction obtained from such juices as apple, grape and the like. However, in contrast with what is done with the base flavors obtained from the citrus juices, it is necessary that the fresh-like citrus flavor constituents be added back to the citrus juice concentrates in order to provide products capable of being reconstituted to a full flavored juice having the original, fresh-like character and flavor.

The aforementioned temperatures at which the third stage condenser is maintained and with which the process of the present invention is most particularly concerned, are provided by the use of liquid air (B. P. —292° F.), liquid nitrogen (B. P. —321° F.), liquid oxygen (B. P. —297° F.) and liquid helium (B. P. —448° F.). In some cases it is possible to effect complete condensation of the more volatile flavoring constituents at temperatures of approximately —130° F., whereas in the case of other fruit materials the successful practice of the process of the present invention requires the use of condensing temperatures of the order of —325° F. or lower. In any case, it will be found more efficient from the standpoint of a commercial operation to employ temperatures not lower than those adequate for the desired condensation. In such an event, the aforementioned refrigerants can be employed to provide the higher temperatures with the attendant economy of operation merely by suitable condenser design, the ratio of condenser surface to refrigerant gas volume being increased to a sufficient extent.

In addition to the process detailed above for providing the fruit flavor constituents, it is also possible to employ a process of desorption. Such a process involves the use of an inert gas such as nitrogen, helium and the like to sweep the juice and may be used in conjunction with the evaporation apparatus aforementioned. The use of such an inert gas is occasioned by the fact that the fruit juices usually contain an inadequate amount of non-condensable gases from the standpoint of effecting the rapid removal of the flavoring constituents with which the invention is concerned. Sweeping the juice with an inert gas in combination with the evaporation under reduced pressure provides for the rapid removal of the flavoring constituents as is evidenced by the fact that it is only necessary to bring over about ½% of the volume of the juice in order to remove all of the fruit flavor constituents therefrom, whereas, as aforementioned, it is ordinarily necessary to evaporate at least 2% of the fruit juice. The inert gas may be employed in such an amount as to provide a ratio of 1 volume of the gas to 4 volumes of juice, the gas volume being measured at standard temperature and pressure. The effect of using an inert gas for desorption is to increase, effectively, the vapor pressure of the water and flavoring constituents. This is evidenced by the smaller amount of water condensed in the first stage condenser discussed above and the fact that substantially all of the fruit flavoring constituents are collected in the third stage condenser. Using nitrogen in a ratio of 1 volume of the same to 4 volumes of juice results in about 90% of the distillate being condensed in the first and second stage condensers with the remaining 10% being collected in the third stage condenser. The material collected at the first two stages is water and is discarded, while that collected at the third stage is water containing the less volatile base and the more volatile fresh-like fruit flavoring constituents. The use of desorption places a greater burden on the third stage condenser requiring the expensive refrigerant and to this extent detracts from the advantage mentioned above in connection with the volume of juice required to be evaporated in order to bring over all of the flavoring constituents.

In addition, the desorbing gas can be used at atmospheric pressure and room temperature to remove the flavoring constituents from the fruit juice. In this case a considerably greater volume of gas is required with respect to the volume of fruit juice treated, being of the order of 50 to 100 times the volume of the juice as measured at standard temperature and pressure.

In addition to the various fruit materials detailed above, it is also possible to apply the process of the present invention to other materials such as onions, garlic, horse radish, celery, peppers and other vegetables, to mace, cinnamon, cloves, allspice, sage and other spices, and to flower or perfume essences such as those obtained from roses, lilacs, gardenias and other flowers. In the case of dry materials it is usually necessary to rely upon the use of a sweeping gas for the removal of the volatile flavoring or other aromatic principles from the natural material so that the aromatic principles can be condensed and thus provided in concentrated form.

While it has been shown above that drastically reduced temperatures are required in many cases to insure the success of the fractional condensation with which the present invention is concerned, it has also been found that the aromatic flavoring constituents of the citrus juices can be fractionally condensed without the necessity of resorting to such drastically reduced temperatures provided the amount of non-condensable gases contained in the vapor or distillate stream is carefully regulated. In condensing the aromatic flavoring constituents from juices other than the citrus juices the volatility of said constituents is often so great as to require the aforementioned drastically reduced temperatures of condensation. Also, it is often the case that in order to effect a worthwhile separation of the water, the base flavoring constituents and those responsible for the fresh-like flavor, it is necessary to effectively increase their volatility by, for example, introducing appreciable amounts of non-condensable gases into the vapor stream. This in turn requires the use of the more drastically reduced temperatures of condensation, not only in connection with the condensation of the fresh-like flavoring constituents but also for that of the less volatile, base flavoring constituents.

In the case of the citrus juices it is preferred that the non-condensable gases in the distillate stream be kept relatively low so that in said stream the ratio of the non-condensable gases to the aromatic flavoring constituents is not in excess of 5 to 1, preferably as low as 1 to 1 or even 1 to 2. This ratio is determined by the insertion of any suitable device for measuring gas flow, such a device being inserted between the second and third stage condensers and another after the third stage condenser. In this way the flow of the non-condensable gases is determined directly, that of the fresh-like flavoring constituents by difference. The base flavoring constituents are of about the same amount as those that are the more volatile but their volume or amount cannot be determined conveniently during processing because of the large amount of water vapor with which they are condensed.

The bulk of the water vapor, i. e., 90–98%, is removed in the first condenser by cooling the distillate stream at a temperature between 5° and 20° F. below the juice evaporation temperature.

The range of the latter being 40°–90° F., the range of the temperatures for the first condenser are, therefore, between 32° and 85° F. Temperatures below 32° F. are not desirable since this results in the formation of ice with the attendant mechanical problem of effecting its removal from the condenser. At temperatures which are less than 5° F. below the juice evaporation temperature the temperature differential is insufficient for satisfactory efficiency of condensation, an excessive amount of water vapor passing through the first condenser and placing an excessive load upon the second condenser. The latter is usually maintained at a lower temperature by means of a more expensive refrigerant than that employed in cooling the first condenser. On the other hand, when the distillate stream is cooled to substantially more than 20° F. below the temperature at which the juice evaporation occurs, the result is an unbalancing of the fractional condensation system with a loss of the sharp separation of which the system is capable. This is usually manifested by the detection of some of the less volatile, base flavoring material in the condensate from the first condenser. In such cases it is virtually impossible as a practical matter to recover the aromatic flavoring material because of the extremely large proportion of water.

The distillate going to the first condenser is predominantly water vapor, there being less than 0.5% by weight of aromatic citrus flavoring constituents present in the distillate stream at this point. It is for this reason possible to condense out the aforementioned high proportion of water in the first condenser and to do so using a temperature approximately the same as the true temperature of condensation for water vapor under the pressure existing in the system. The aromatic flavoring constituents are present in such a small percentage that even though the boiling points of the different individual constituents are higher than that of water, there is no detectible condensation of the flavoring materials at this point. The removal of the large percentage of water vapor from the distillate stream at this point results in a concentration of from 10- to 50-fold in the aromatic constituents. However, the distillate stream leaving the first condenser still comprises a high proportion of water, there being generally less than 5% and often as little as 1% by volume of aromatic flavoring constituents in the stream.

Practically all of the remaining water vapor together with the less volatile, base flavoring materials is condensed in the second condenser which is maintained at a temperature within the range of about —25° to 32° F. The base flavoring materials obtained at this point are substantially immiscible with water and are obtained as a cloudy emulsion in the water which is condensed at this point, the flavoring material usually constituting less than 3% of the total condensate. The maintenance of this temperature is a somewhat critical matter. If the temperature of the second condenser is too high all of the base flavoring substance will not be condensed therein and an appreciable portion of the same will go over into the subsequent condensers with consequent contamination of the more volatile, fresh-like flavor constituents. On the other hand, if the temperature is too low an appreciable portion of the more volatile, fresh-like flavoring constituents will be condensed along with the base flavor materials and, therefore, the yield of the fresh-like constituents will be accordingly decreased.

It has been found that for best results in the case of the citrus juices the second condenser should be maintained within a temperature range which is somewhat sharply defined depending upon the absolute pressure obtaining in the system. This range is set forth below:

| Absolute Pressure | Temperature Range, °F. |
| --- | --- |
| 35 mm | 28 to 32 |
| 30 mm | 26 to 30 |
| 25 mm | 23 to 27 |
| 20 mm | 18 to 22 |
| 15 mm | 12 to 16 |
| 10 mm | 2 to 6 |
| 5 mm | —11 to —15 |

The above covers the entire practical range, the range being determined by the fact that 5 mm. is about the lowest pressure obtainable with commercial apparatus and that at pressures about 35 mm. excessive juice evaporation temperatures which can result in the development of cooked flavors are required.

The vapor stream leaving the second condenser is reduced in volume to about 1% of that which entered the same and is substantially devoid of water vapor although some still remains in the gas stream. When operating under optimum conditions the material which passes to the third condenser contains about 5 parts by volume of water to about 40 parts by volume of the volatile, fresh-like flavoring constituents. This material may be condensed in a third condenser maintained at a temperature within the range of about —80° to —200° F. The main factor which controls the temperature at which the third condenser is operated is the ratio by volume of the non-condensable gases to the condensable material such as the aforementioned volatile flavoring constituents and whatever water is remaining in the vapor stream. The non-condensable gases are, for the most part, air but may also include extremely minute quantities of hydrogen sulphide, ethylene and the like. In a case where the volume of the condensable vapors is about equal to that of the non-condensable gases the temperature of the third condenser need only be maintained as low as —80° to —120° F. Where the volume of non-condensable gases is five times that of the condensable vapors temperatures below —130° F. and even as low as —200° F. are required. At higher ratios of non-condensable to condensable material, say, 10:1 and 20:1, it is necessary to use still lower temperatures such as —300° or —400° F., respectively. This can also be done by using, in addition to the third condenser at, say, —150° F., a fourth condenser maintained at —300° F. or —400° F. However, it is not desirable to employ such extremely low temperatures because of the expense of the refrigerant that needs to be employed and hence the importance of carefully controlling the volume of non-condensable gases in the system.

The following specific examples are illustrative of the operation of the process of the present invention:

*Example I*

Approximately 50 gallons of fresh, expressed grape juice is introduced in a continuous fashion into an evaporator consisting of a falling film type heat exchanger, a vapor-liquid separator and a surface condenser. The absolute pressure in the system is maintained at approximately 20 millimeters of mercury. The temperature of the heating medium is maintained at approximately 155° F. The boiling point is approximately 70° F. The temperature of the primary condensing medium is maintained at approximately 50° F. The juice is circulated by means of a pump through the heat exchanger and the liquid vapor separator. The vapors flashing from the liquid vapor separator are partially condensed in the surface condenser of the evaporator. The remaining vapors are then directed through a second stage of condensation in which the condensing medium is maintained at a temperature of approximately 15° to −5° F. The actual condensing temperature inside this stage is approximately 32° F. In this particular instance the condensate is formed on the walls of the second stage condenser in a solid state. The remaining condensed vapors are then directed to a third stage condenser which further removes condensable material at a temperature of approximately −285° F. Such a temperature is achieved inside this third stage condenser by surrounding the condensing surfaces with liquid nitrogen. The remaining so-called non-condensable gases, principally oxygen, nitrogen, and possibly carbon dioxide, are then discharged to the atmosphere by means of a conventional two-stage steam ejector.

This operation of evaporation and condensation in three different stages is continued until 5 gallons of distillate or approximately 10% of the original 50 gallons of juice has been evaporated. Of this 5 gallons a little less than 4¾ gallons are removed in the first stage condenser. It is substantially all water and contains little if any characteristic fruit flavor constituents. Approximately ¼ gallon is removed in the second stage condenser and contains in addition to water substantially all of the base aromatic fraction. In the third stage condenser is found approximately ½ pound of material which contains substantially all of the fresh-like aromatic fruit flavor constituents. At this point the second and third stage condensers are disconnected and evaporation continues using only the first stage condenser until a concentrate is obtained. Evaporation is then stopped. The condensate from the second stage is removed and added to the concentrate in the desired amount. The condensate from the third stage condenser which contains the fresh-like aroma is added in its entirety to the concentrate. The resulting product when reconstituted with water is substantially the same in flavor to the original juice.

*Example II*

Approximately 50 gallons of a fresh-pressed apple juice is introduced into an evaporator identical to the unit described in Example I. Heating medium temperatures, boiling point temperatures, pressures and condensing temperatures are identical to those specified in Example I.

As in Example I, approximately 10% of the 50 gallons, or approximately 5 gallons, is evaporated initially and the vapors are condensed as in Example I in three stages of condensation. The non-condensable gases are discharged into the atmosphere through a typical two-stage steam ejector. The second and third stages of condensation are by-passed at the end of the first 10% of evaporation, and evaporation proceeds normally with the first stage condenser.

Of the initial 5 gallons evaporated, approximately 4½ gallons of the vapor are condensed in the first stage. This is substantially pure water and contains no detectible apple flavor constituents. Approximately 4 pounds of material is condensed in the second stage of condensation. This condensate contains a high percentage of water, but, in addition, substantial amounts of a base aromatic fraction in solution in the water. Approximately ½ pound of material is collected in the third stage of condensation which contains in addition to water a relatively large amount of a highly volatile aromatic fraction having the typical fruity, fresh-like apple character and aroma.

Evaporation is continued until approximately a 5 or greater fold concentration is achieved. The concentrate is then removed from the evaporator and the condensate in the second stage added to the concentrate in the desired amount. This may be the entire amount of this fraction or may be some lesser amount. The entire amount of condensate from the third stage of condensation is then usually added to the concentrate, although here again it may not be necessary or desirable to add the full amount. The resulting combination of concentrate and aroma fractions from the second and third stages usually results in the equivalent of a 4-fold concentrate. This is then filled into containers, sealed and frozen to 0° F., and stored at this temperature. This product, upon reconstitution with three parts of water produces a reconstituted apple juice essentially the same as the original juice from which it was made with respect to flavor and fresh-like character.

*Example III*

Approximately 50 gallons of freshly extracted orange juice is introduced into an evaporator identical to the unit described in Example I. The rate of introduction, however, is appreciably faster in this instance and there is also entered into the evaporator, by means of a jet in the juice stream ahead of the heat exchanger, a volume of nitrogen gas. The volume (S. T. P.) of this gas fed into the system is approximately ¼ to ⅓ the volume of the juice. In other words, the rate of feed of the nitrogen as measured in volume per unit of time is approximately ⅓ or ¼ the rate of feed of juice as measured in volume per unit of time. The intimate mixing of the nitrogen gas with the juice as it flows through the heat exchanger and into the liquid vapor separator facilitates the removal of all volatile aroma constituents of the orange juice, to the extent that as a result of flashing or evaporating approximately ½ gallon substantially all of the aroma volatile flavor fractions can be separated from the juice. In this instance, the first stage of condensation can operate at a condensing temperature of just above 32° F. and substantially the entire amount of material condensed at this temperature will be water. The remaining vapors which will be principally citrus oils, water and the highly volatile fresh-like aromatic fraction are then condensed directly in a second stage condenser operated at a condensing temperature of approximately −280° F. Once all of the juice has been passed through the evaporator or stripping unit, and substantially all of the aroma fractions removed from the juice, the second stage of the condensation is by-passed and evaporation proceeds normally until a 6-fold degree of concentration is reached. The condensate from the second stage condenser is separated into an oil fraction and a water fraction by either centrifugal pressure or by simple decantation. The desired level of the oil fraction is then incorporated into the concentrate. This may or may not be the entire amount of oil collected. Generally, the entire amount of the water fraction separated from the oil as aforesaid and containing the fresh-like aromatic constituents is added to the concentrate. The mixture is well blended, filled into containers which are sealed and then frozen to 0° F. and stored at the same temperature. This product upon reconstitution with five parts of water produces a reconstituted orange juice the same as the original juice from which it was prepared with respect to the orange flavor and the aroma or fresh-like orange character.

*Example IV*

Approximately 50 gallons of freshly extracted orange juice are introduced into an evaporator identical to the unit described in Example I. The temperature of the heating medium is approximately 115° F. The boiling point is approximately 60° F., the absolute pressure of the system being about 14 mm. of mercury. The juice is circulated by means of a pump through the heat exchanger and the liquid-vapor separator. The vapors flashing from the liquid-vapor separator are conducted at the rate of 100 lbs./hr. to the first stage condenser wherein they are cooled to a temperature of about 50° F., the cooling medium being cold water. This results in the condensation of about 95% of the entire distillate stream, the condensate being water containing no detectible amounts of aromatic flavor constituents. The vapors from the first stage condenser are then conveyed to the second stage condenser in which they are cooled to about 12° F., the cooling medium in this condenser being brine. The remaining vapors at a velocity of about 80 cu. ft./hr. are then conducted to the third stage condenser where they are cooled to about —100° F., the cooling medium in this case being a mixture of Dry Ice and acetone. The exit vapors or gases from the third stage condenser are comprised entirely of non-condensable gases and are discharged to the atmosphere at the rate of about 50 cu. ft./hr.

The operation of evaporation and fractional condensation in the three different stages is continued until 5 gallons of distillate or approximately 10% of the original 50 gallons of juice have been evaporated. Of this 5 gallons a little less than 4¾ gallons are removed in the first stage condenser, the condensate being water and little more as stated hereinbefore. Approximately ¼ gallon of distillate is removed by the second stage condenser, the bulk of the condensate being water but containing emulsified therein about 1% of its weight of the less volatile, base flavor constituents of the orange. The condensate from the third stage condenser amounts to about 2 oz. of material, most of which is water, but about 10% of which is the more volatile, aromatic orange flavoring constituents responsible for the fresh-like flavor of the fruit.

After about 10% of the volume of the juice has been distilled, as indicated above, the removal therefrom of the aromatic flavoring constituents is complete so that the second and third stage condensers are disconnected and the evaporation is continued using only the first stage condenser until a 6-fold concentrate is obtained. Evaporation is then halted. A small amount of the condensate from the second stage condenser is added to the concentrate although a greater amount may be added if desired. The condensate from the third stage condenser is added in its entirety to the 6-fold concentrate, the latter is then filled into containers, sealed and frozen at 0° F. The resulting product when reconstituted with five parts of water is substantially the same flavor as the original juice.

It is also possible to obtain the fruit flavoring constituents with which the present invention is concerned, by condensing the flavor constituents which are given off with the sublimation of the ice content of a frozen fruit material.

Herein and in the appended claims, the temperatures recited in connection with the different stages of condensation involved in the fractional condensation with which the present invention is concerned are intended to indicate the temperature to which the vapors and/or gases are cooled within the condenser.

While several examples have been used to illustrate the invention, it is to be understood that the invention is not limited to such examples. Modifications of the invention other than those disclosed will be readily apparent to those skilled in the art and are intended to be included within the invention as defined by the appended claims.

This application is a continuation-in-part of our prior application Serial No. 171,747, filed July 1, 1950, and now abandoned.

What is claimed is:

1. A process for obtaining volatile flavor constituents and essences in a high degree of concentration from aromatic materials including fruits, vegetables, spices, flowers and the like which comprises vaporizing the volatile flavor constituents in the aromatic material under conditions which prevent impairment of the quality of said constituents, condensing and removing the bulk of the water vapor at a temperature above 32° F., condensing the heavier less volatile base flavor constituents at a temperature within the range of about 32° F. to —95° F., and condensing the more volatile fresh-like flavor constituents at a temperature below —130° F.

2. The process of claim 1 in which the volatile flavor constituents are vaporized under an absolute pressure of less than 190 mm. of mercury and at a temperature of less than 150° F.

3. A process for obtaining volatile citrus fruit flavor constituents which comprises removing said constituents from a citrus fruit material containing the same under an absolute pressure of less than 75 mm. of mercury and at a temperature of less than 115° F., condensing and removing the bulk of the water vapor which is distilled along with said constituents at a temperature above 32° F., condensing the heavier less volatile base flavor constituents at a temperature within the range of about 32° F. to —95° F., and condensing the more volatile fresh-like fruit flavor constituents in a high degree of concentration at a temperature below —130° F.

4. The process of claim 3 in which orange juice is the citrus material.

5. A process for obtaining the volatile fresh-like apple flavor constituents which comprises removing said constituents from an apple material containing the same under an absolute pressure of less than 190 mm. of mercury and at a temperature of less than about 150° F., condensing and removing the bulk of the water vapor which is distilled along with said constituents at a temperature above 32° F., condensing the heavier less volatile base flavor constituents at a temperature within the range of about 32° F. to −95° F., and condensing the more volatile fresh-like apple flavor constituents at a temperature below −130° F.

6. A process for obtaining the volatile fresh-like tomato flavor constituents which comprises removing said constituents from a tomato material containing the same under an absolute pressure of less than 190 mm. of mercury and at a temperature of less than 150° F., condensing and removing the bulk of the water which is distilled along with said constituents at a temperature above 32° F., condensing the heavier less volatile base flavor constituents at a temperature within the range of about 32° F. to −95° F., and condensing the more volatile fresh-like tomato flavor constituents at a temperature below −130° F.

7. The process according to claim 3 in which grapefruit is the citrus material.

8. A process for obtaining the volatile fresh-like pineapple flavor constituents which comprises removing said constituents from a pineapple material containing the same under an absolute pressure of less than 75 mm. of mercury and at a tempearture of less than 115° F., condensing and removing the bulk of the water which is distilled along with said constituents at a temperature above 32° F., condensing the heavier less volatile base flavor constituents at a temperature within the range of about 0° F. to −95° F., and condensing the more volatile fresh-like pineapple flavor constituents at a temperature below −130° F.

9. In a process for obtaining volatile fruit flavor constituents wherein said constituents are removed from a fruit material containing the same under an absolute pressure less than 190 mm. of mercury and a temperature of less than about 150° F., the improvement comprising condensing and removing the bulk of the water vapor which is distilled along with said constituents at a temperature above 32° F., condensing the heavier less volatile base flavor constituents at a temperature within the range of about 32° F. to −95° F., and condensing the more volatile fresh fruit flavor constituents in a high degree of concentration at a temperature below −130° F.

10. A process for producing a fruit material concentrate from a fruit material having a high moisture content, said concentrate being capable of reconstitution by the addition of water to the original fruit material and having substantially the entire original aroma and flavor thereof, comprising vaporizing the volatile fruit flavor constituents and a portion of the water contained in the fruit material under conditions which prevent impairment of the quality of said constituents, condensing and removing the bulk of the water vapor at a temperature above 32° F., condensing substantially all of the flavor constituents including the heavier less volatile base flavor constituents and the more volatile fresh fruit flavor constituents in a high degree of concentration at a temperature below −130° F., and adding at least a portion of said condensed volatile fruit flavor constituents to a concentrate of the fruit material.

11. A process according to claim 1 as applied to a liquid fruit material employing an inert gas to facilitate by desorption the removal of the volatile fresh-like fruit flavor constituents therefrom.

12. A process according to claim 10 as applied to orange juice employing an inert gas to facilitate by desorption the removal of the volatile fruit flavor constituents therefrom.

13. A process for producing a fruit juice concentrate capable of reconstitution by the addition of water to the original fruit juice having substantially the entire original aroma and flavor thereof comprising vaporizing the volatile fruit flavor constituents and a portion of the water contained in the fruit juice under conditions which prevent impairment of the quality of said constituents, condensing and removing the bulk of the water vapor at a temperature above 32° F., condensing the heavier less volatile base flavor constituents at a temperature within the range of about 32° F. to −95° F., condensing the more volatile fresh fruit flavor constituents in a high degree of concentration at a temperature below −130° F., and adding at least a portion of the more volatile fresh fruit flavor concentrate to a concentrate of the fruit juice.

14. A process according to claim 13 in which the fruit juice is orange juice and the fresh-like fruit flavor constituents are removed from the orange juice under a reduced pressure of less than 75 mm. of mercury and at a temperature of less than about 115° F.

15. A process for obtaining volatile citrus flavor constituents which comprises removing said constituents from a citrus juice under an absolute pressure within the range of 5–35 mm. of mercury and at a temperature within the range of 40°–90° F., condensing and removing the bulk of the water vapor which is distilled along with said constituents at a temperature within the range of 32°–85° F. and also between 5° and 20° F. below the juice evaporation temperature, condensing the heavier less volatile base flavor constituents at a temperature within the range of −15° to 32° F., the lower temperatures of condensation being employed at the lower pressures of evaporation, and condensing the more volatile fresh-like flavor constituents in a high degree of concentration at a temperature within the range of −80° to −200° F. while maintaining the ratio of non-condensable gases to condensable vapors below 5 to 1.

16. The process of claim 15 in which orange juice is the citrus material.

17. A process for producing a citrus juice concentrate capable of reconstitution by the addition of water to the original fruit juice having substantially the entire original aroma and flavor thereof comprising vaporizing the volatile fruit juice constituents and a portion of the water contained in the fruit juice under an absolute pressure within the range of 5–35 mm. of mercury and at a temperature within the range of 40°–90° F., condensing and removing the bulk of the water vapor which is distilled along with said constituents at a temperature within the range of 32°–85° F. and also between 5° and 20° F. below the juice evaporation temperature, condensing the heavier less volatile base flavor constituents at a temperature within the range of −15° to 32° F., the lower temperatures of condensation being employed at the lower pressures of evaporation, condensing the more volatile fresh-like flavor constituents in a high degree of concentration at a temperature within the range of −80° to −200° F. while maintaining the ratio of non-condensable gases to condensable vapors below 5 to 1, and adding at least a portion of said fresh-like flavor fraction to a concentrate of the same citrus juice.

18. A process for producing a citrus juice concentrate capable of reconstitution by the addition of water to the original fruit juice having substantially the entire original aroma and flavor thereof comprising vaporizing the volatile fruit juice constituents and a portion of the water contained in the fruit juice under an absolute pressure of about 14 mm. of mercury and at a temperature of about 60° F., condensing and removing the bulk of the water vapor which is distilled along with said constituents at a temperature within the range of about 40°–55° F., condensing the heavier less volatile base flavor constituents at a temperature within the range of about 12°–16° F., condensing the more volatile fresh-like flavor constituents in a high degree of concentration at a temperature within the range of —80° to —120° F. while maintaining the ratio of non-condensable gases to condensable vapors at about 1 to 1, and adding at least a portion of said fresh-like flavor fraction to a concentrate of the same citrus juice.

19. The process of claim 18 in which the citrus juice is orange juice.

KENNETH G. DYKSTRA.
DOMENIC DE FELICE.

References Cited in the file of this patent

UNITED STATES PATENTS

| Number | Name | Date |
|---|---|---|
| 2,306,061 | Johnson | Dec. 22, 1942 |
| 2,423,746 | Zahm | July 8, 1947 |
| 2,513,813 | Milleville | July 4, 1950 |

FOREIGN PATENTS

| Number | Country | Date |
|---|---|---|
| 246,454 | Great Britain | 1926 |
| 289 | Australia | 1926 |